UNITED STATES PATENT OFFICE.

DANIEL DRAWBAUGH, OF EBERLY'S MILL, PENNSYLVANIA.

SUBSTANCE FOR TELEPHONE-ELECTRODES.

SPECIFICATION forming part of Letters Patent No. 570,845, dated November 3, 1896.

Application filed January 10, 1896. Serial No. 575,013. (No specimens.)

*To all whom it may concern:*

Be it known that I, DANIEL DRAWBAUGH, a citizen of the United States, residing at Eberly's Mill, in the county of Cumberland and State of Pennsylvania, have invented certain new and useful Improvements in Substances for Telephone-Electrodes; and I do hereby declare the following to be a full, clear, and exact description of the invention, such as will enable others skilled in the art to which it appertains to make and use the same.

This invention relates to substances for telephone-electrodes.

The object of the invention is to present a ready and efficient substitute for the granular carbon now employed in many forms of telephones.

With this object in view the invention consists generally in the preparation of any suitable metal for the purpose.

My invention consists specifically in the employment of platinum in suitably-prepared form.

Heretofore platinum has been suggested and tried as an electrode, either in the form of bare pellets of the compact metal or in the form of spongy platinum, but the same has been found to be of too high conductivity for efficient use. By my invention the conductivity of the metal employed, particularly platinum, is suitably lowered. As an example of one means of carrying my invention into effect I take or prepare a form of platinum which shall be of lower conductivity than when the metal is employed in its usual compact condition, or in the condition of spongy platinum, and present this, my lower conductive form of platinum, as a body of granules or upon suitable surfaces for electrodes.

To present platinum in proper form, I take suitably small particles of this metal or of any other metal or of any other suitable substance and deposit upon the same by electrodeposition platinum-black, or I take platinum either in the form of the compact metal, such as platinum wire, or in the form of platinum-sponge, divide it into small pieces or particles, and convert the surface into platinum-black.

Instead of presenting my form of platinum in granules I may make telephone-electrodes with platinum-black by depositing this upon suitable silver plates or silver-plated pieces or buttons, or, in some cases, I may take silver or other metals and by suitably depositing thereon a lower conductor, as platinum-black, obtain good results.

One method employed by me for depositing platinum-black electrolytically is as follows: I take a suitable vessel, preferably of glass, and place therein near the bottom a plate of any suitable metal, such as silver, platinum, or the like. At some distance above this plate and parallel therewith is supported a tray made of fine wire closely woven, and upon this tray or screen is placed the platinum or other metal in granules or otherwise upon which the platinum-black is to be deposited. To the plate is secured a rod connected by a wire with the positive pole of a battery, and to the tray is secured a like rod connected by a wire with the negative pole of the battery. The vessel is now filled with a sufficient quantity of a weakened solution of chlorid of platinum to cover the tray and its contents. The current passes from the positive pole of the battery to the plate in the bottom of the vessel, thence upward through the solution, decomposing it and precipitating the platinum held in suspension therein upon the surface of the granules in the form of platinum-black, it being understood that the depth of the deposit will be determined by the length of time the current is allowed to pass through the solution. When the required deposit is obtained, the tray is removed from the solution, and its contents being thereupon washed and dried will then be ready for use.

In its finely-comminuted state, either as spongy platinum having its surface covered with platinum-black or as platinum-black, platinum possesses a remarkable power of absorbing and condensing gases and absorbing moisture, and to this may possibly be ascribed the efficiency of the action of my new substitute for carbon.

I have found by experiment that by the employment of platinum in the form above described I obtain a distincter articulation in use, and there will be no so-called "break" or "slur" in talking to the transmitter, no matter how sudden or loud may be the projected sound, and a marked advantage of my product is that it does not pack; furthermore, that in the use of the form so prepared a much smaller quantity than of the carbon is necessary.

Having thus fully described my invention, what I claim as new, and desire to secure by Letters Patent, is—

1. A microphonic element composed of a substance having its surface covered with platinum-black, substantially as described.

2. A microphonic element composed of a granular substance having its surface covered with platinum-black, substantially as described.

3. A microphonic element composed of granular, finely-divided, or comminuted metal having its surface covered with platinum-black, substantially as described.

4. A microphonic element composed of granular, finely-divided, or comminuted platinum having its surface covered with platinum-black, substantially as described.

In testimony whereof I affix my signature in presence of two witnesses.

DANIEL DRAWBAUGH.

Witnesses:
R. G. DYRENFORTH,
E. H. PARRY.